Figure 1:
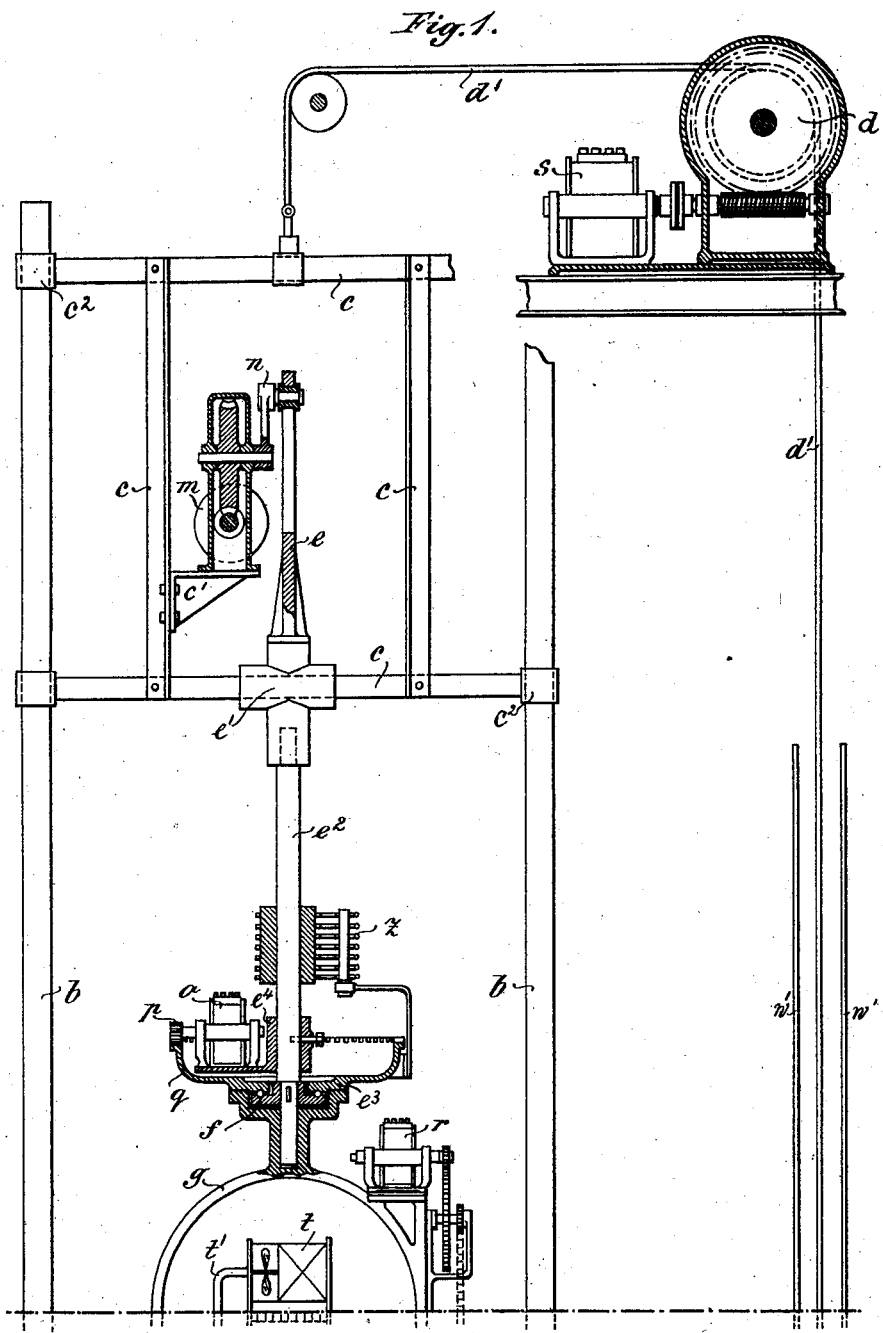

No. 745,391. PATENTED DEC. 1, 1903.
P. T. SIEVERT & E. KLEIN.
APPARATUS FOR PRODUCING HOLLOW GLASS ARTICLES.
APPLICATION FILED MAY 14, 1903.
NO MODEL. 5 SHEETS—SHEET 1.

Witnesses:
C. A. Jarvis.
C. C. Fuss.

Inventors:
Paul Theodor Sievert.
Eugen Klein.
By their Attorney,
F. N. Richards.

No. 745,391. PATENTED DEC. 1, 1903.
P. T. SIEVERT & E. KLEIN.
APPARATUS FOR PRODUCING HOLLOW GLASS ARTICLES.
APPLICATION FILED MAY 14, 1903.
NO MODEL. 5 SHEETS—SHEET 2.
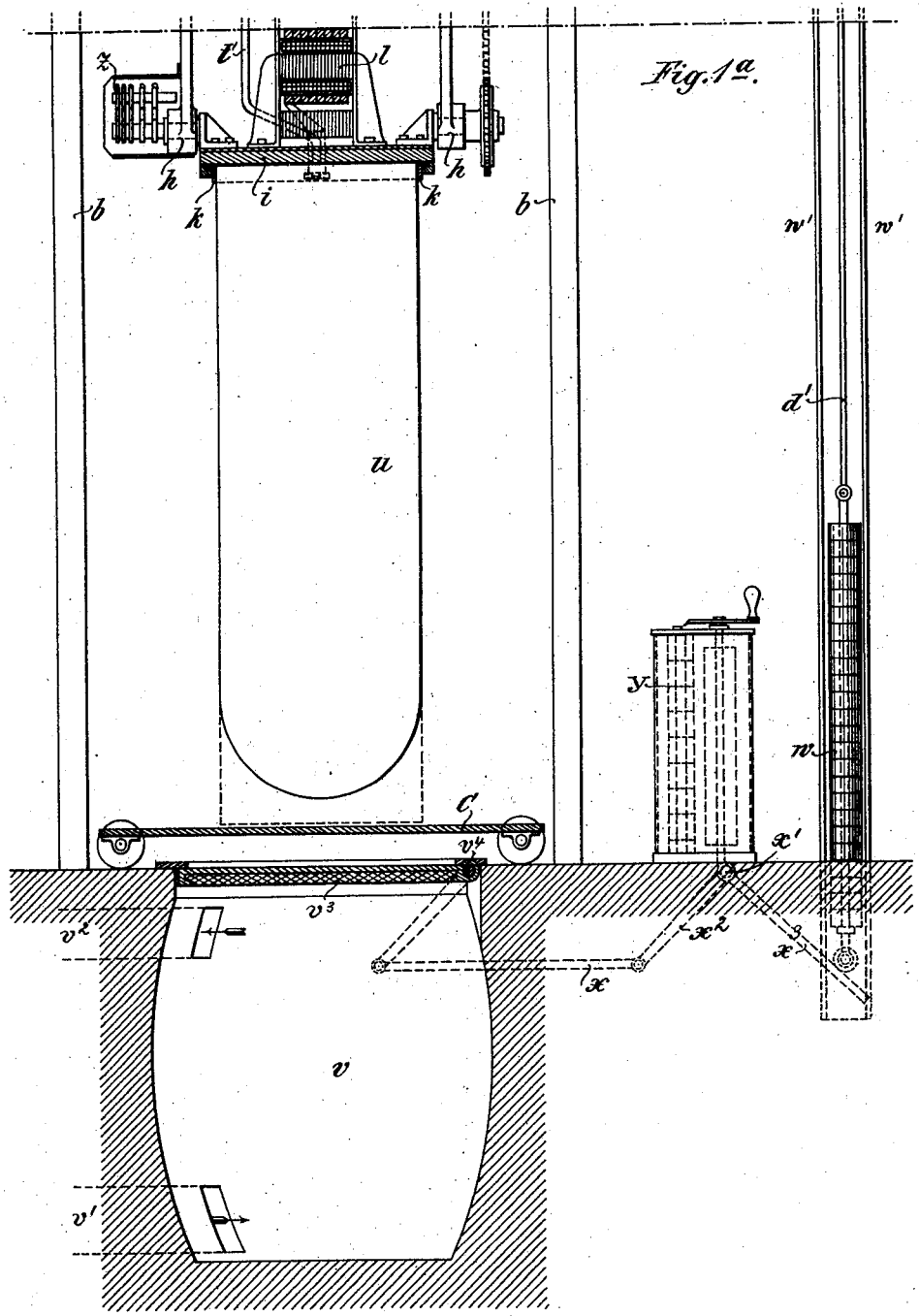

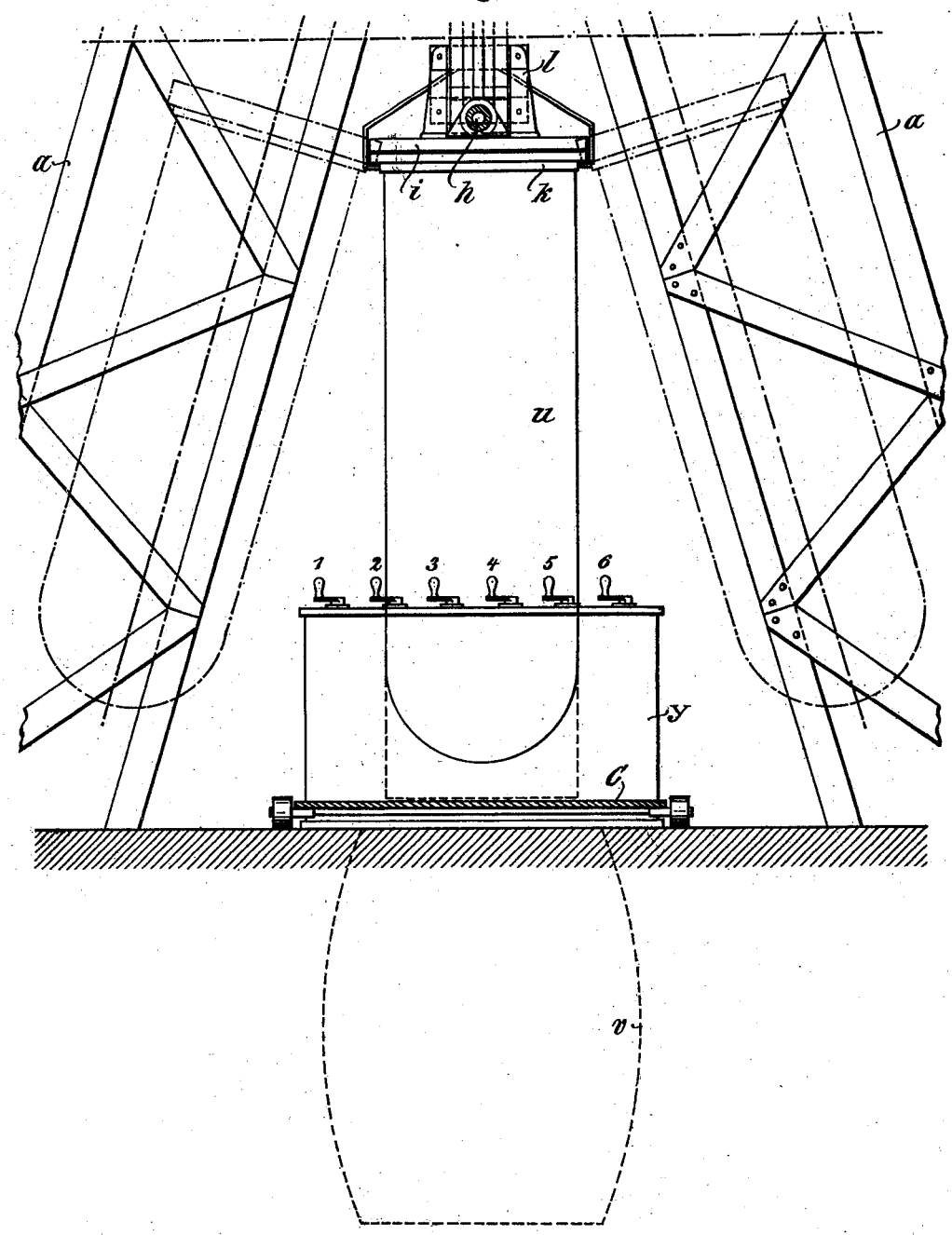

No. 745,391. PATENTED DEC. 1, 1903.
P. T. SIEVERT & E. KLEIN.
APPARATUS FOR PRODUCING HOLLOW GLASS ARTICLES.
APPLICATION FILED MAY 14, 1903.
NO MODEL. 5 SHEETS—SHEET 5.
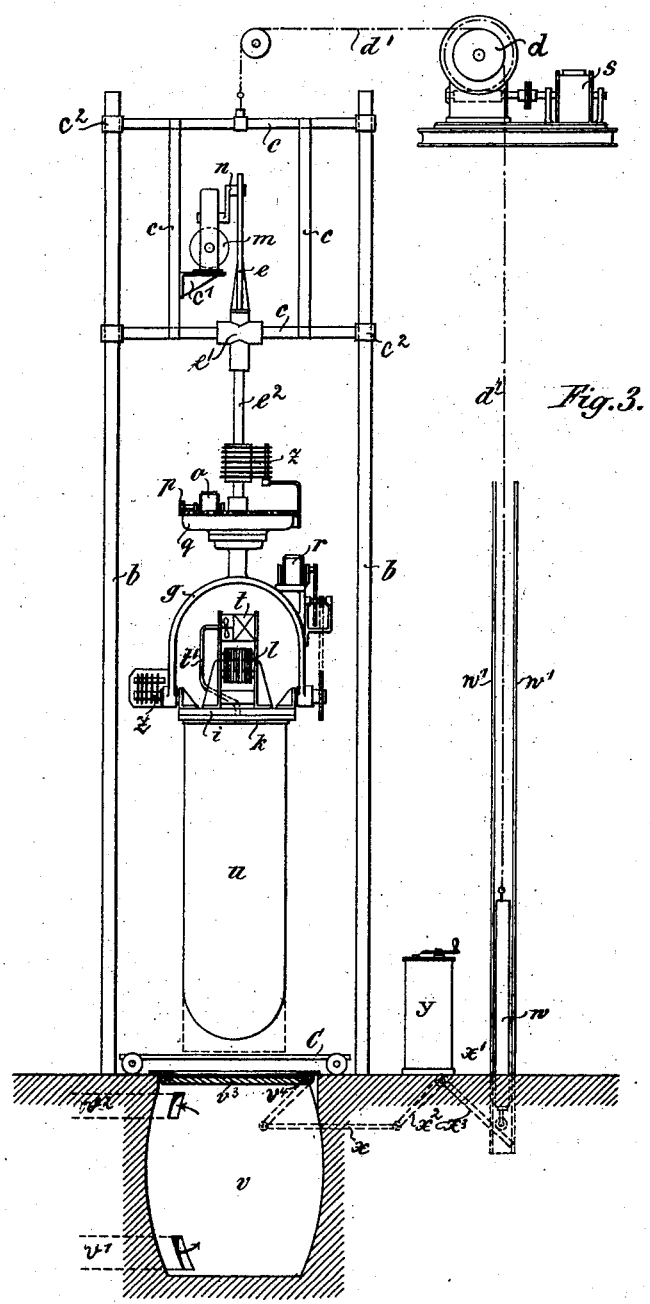
Witnesses:
C. A. Jarvis
O. C. Fuss
Inventors:
Paul Thedor Sievert
Eugen Klein.
By their Attorney,
F. H. Richards.

No. 745,391. Patented December 1, 1903.

UNITED STATES PATENT OFFICE.

PAUL THEODOR SIEVERT AND EUGEN KLEIN, OF DRESDEN, GERMANY; SAID KLEIN ASSIGNOR TO SAID SIEVERT.

APPARATUS FOR PRODUCING HOLLOW GLASS ARTICLES.

SPECIFICATION forming part of Letters Patent No. 745,391, dated December 1, 1903.

Application filed May 14, 1903. Serial No. 157,038. (No model.)

*To all whom it may concern:*

Be it known that we, PAUL THEODOR SIEVERT and EUGEN KLEIN, citizens of the Empire of Germany, residing at Dresden, in the Kingdom of Saxony, Empire of Germany, have invented a new and useful Apparatus for Producing Hollow Glass Articles, of which the following is a specification.

Our invention relates to an apparatus for mechanically performing the swinging and turning or whirling operations involved in the production of hollow glass bodies, the said apparatus being so arranged that the glass bulb is blown in the free air, and thus retains its natural fire-polish, while the skill, and more particularly the physical force, of the glass-blower is unnecessary for attaining the final shape of the hollow glass body.

The new apparatus comprises, essentially, a plate for receiving the liquid or plastic molten glass sheet, a holding or shape-giving frame for holding in a known manner the edge of this plastic-glass sheet, means for introducing an elastic pressure medium between the plate and the plastic-glass sheet, so that the latter is blown upward or downward, as the case may be, and mechanism for turning the plate, with the holding or shape-giving frame and the glass mass, around an axis in the plate or parallel to the same and for rotating them around an axis at right angles to this plate and for swinging the whole in a vertical plane around a horizontal axis, the mechanism being so arranged that the several operations mentioned can take place either simultaneously or separately or in a certain order and at a convenient varying speed, according to the judgment of the operator, so that the shaping of the hollow glass body can be regulated to a nicety. In case larger hollow glass bodies are to be produced, which require reheating from time to time, the mechanism of the apparatus is so driven as to either lower the plate, with the holding or shape-giving frame and the glass bulb, down into a reheating-chamber or to move them laterally for temporarily submitting the glass bulb to the action of the heat, then again to return these parts into their initial positions, whereupon the process can be continued until it is finished.

An apparatus made according to our invention is illustrated in the accompanying drawings, in which—

Figure 2:
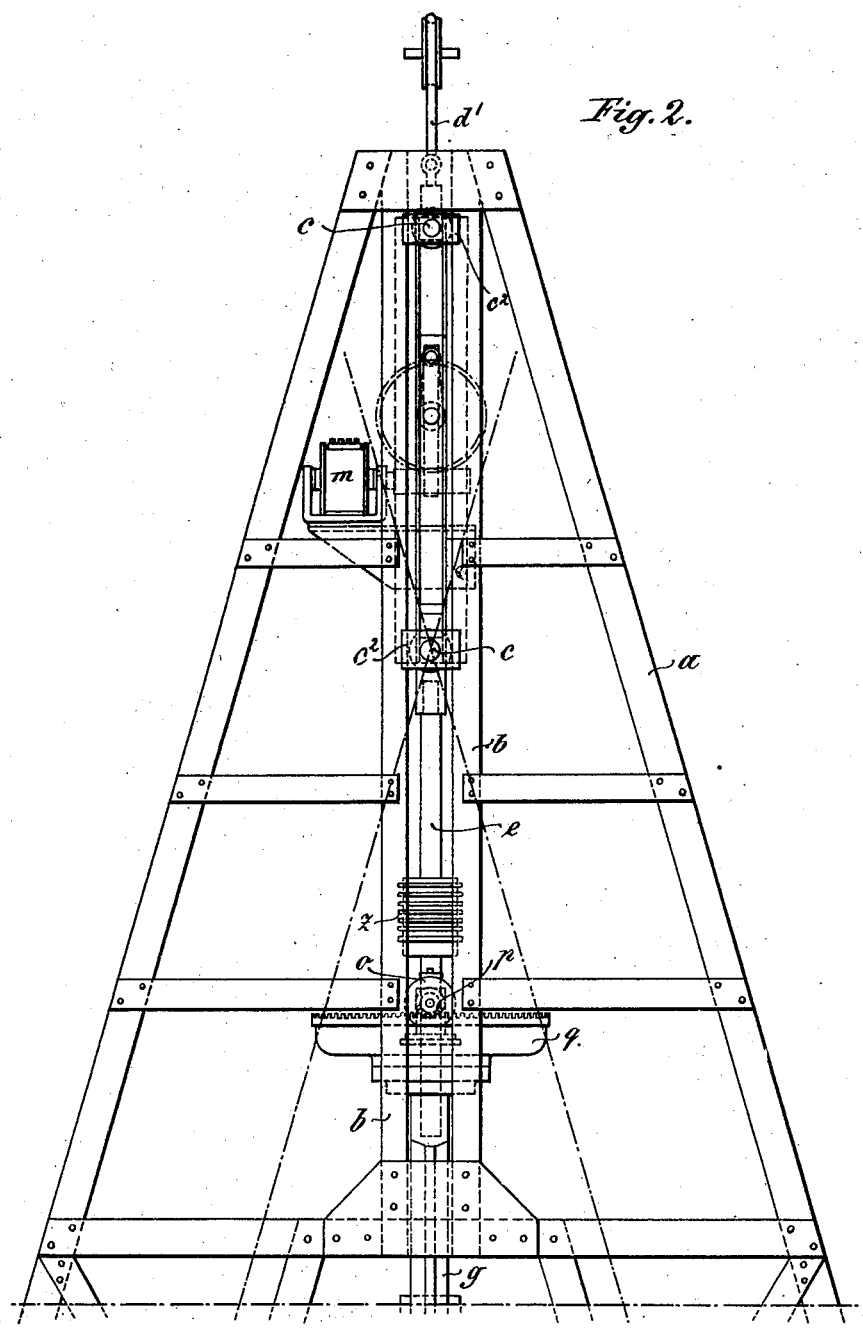

Figure 1 is a central vertical cross-section of the upper part of the apparatus, partly in section. Fig. 1$^a$ is a central vertical cross-section of the lower part of the apparatus, partly in section. Fig. 2 is a front elevation of the upper part of the apparatus proper seen from the left in Fig. 1. Fig. 2$^a$ is a front elevation of the lower part of the apparatus proper seen from the left in Fig. 1$^a$; and Fig. 3 is a side elevation of the entire apparatus, on a reduced scale, certain details being omitted.

Similar characters of reference refer to similar parts throughout the several views.

A convenient stage or tower $a$ of any construction is provided with four vertical guides $b\,b$, between which a frame $c$ is mounted to slide up and down by means of suitable guides $c^2\,c^2$. This frame $c$ is suspended from one end of a rope $d'$, which is led over a convenient guiding-pulley and affixed with its other end on a drum $d$. The latter can be driven from an electric motor $s$ in either direction by means of a worm and a worm-wheel, (see Fig. 1,) so as to raise and to lower, respectively, the frame $c$. A cross-head $e'$ is mounted to turn on the lower horizontal rod of the frame $c$ and is secured between suitable shoulders or set-collars. This cross-head $e'$ is assumed to be cast in one piece with a slotted lever $e$, into the slot of which the pin of a crank $n$ engages by means of a sliding bearing. The crank $n$ can be rotated slowly from the electric motor $m$ by means of a worm and a worm-wheel. (See Fig. 1.) The electric motor $m$ is secured on a suitable support $c'$, affixed on the frame $c$.

The cross-head $e'$ is rigidly connected with a rod $e^2$, which carries a disk $e^3$ and a support $e^4$ for an electric motor $o$. On the disk $e^3$ a crown-wheel $q$ is mounted to turn by means of a ball-bearing $f$, and it can be turned from the electric motor $o$ by means of a pinion $p$. To the nave of the crown-wheel $q$ is attached a fork $g$, which by means of the two trunnions $h\,h$ carries a plate $i$ for receiving the plastic-glass sheet. On this plate $i$ the annular frame $k$ is arranged for holding the edge of the plastic-glass sheet. The adhesion of the glass to this holding or shape-giving frame $k$ can be secured in various known manners, be it by means of a groove in which the edge of the glass sheet hardens, as is described in the United States Patent No. 641,048, of January 9, 1900, or be it by heating the holding-frame $k$ in various manners, the simplest way being to employ electricity, as is described in the United States Patent No. 645,375, of March 13, 1900. In the drawings the latter method is assumed to be adopted. The current required for this purpose is obtained by means of a transformer $l$, which is secured on the plate $i$ itself, so as to avoid sliding contacts and conducting-cables. The plate $i$, with the holding-frame $k$ and the glass sheet or bulb, can be turned around the axis of the trunnions $h\,h$ by means of an electric motor $r$, attached to the fork $g$, and with the aid of gearing and an endless chain.

The elastic pressure medium for blowing the glass sheet into a hollow glass body is in this case assumed to be compressed air, which is supplied by a compressor of any known construction and driven by an electric motor $t$. The latter is secured above the transformer $l$, and it is merely shown diagrammatically, as the kind and the construction of both the compressor and this electric motor $t$ are quite immaterial. The compressed air is conducted from the compressor through a bent tube or hose $t'$ to the central perforation of the plate $i$.

The weight of all the parts suspended from the end of the rope $d'$ is preferably balanced by a counterweight $w$, attached to the rope and guided vertically by suitable guides $w'\,w'$. A reheating-chamber $v$ is assumed to be placed in the ground beneath the plate $i$. The reheating-chamber $v$ is further assumed to receive the hot gases from an oven or any other source by means of the lower channel $v'$, while the spent gases are led off by the upper channel $v^2$. The reheating-chamber $v$ is, moreover, provided with a trap-door $v^3$, which is pivoted at $v^4$ and can be turned downward to allow the glass cylinder $u$ to enter the chamber $v$. For greater convenience the counterweight $w$ is arranged to bear in its lowermost position, (shown at Fig. 1ª,) by means of a roller, on the arm $x^3$ of a bell-crank lever, the other arm, $x^2$, of which is pivotally connected by a rod $x$ with a lever on the axle $v^4$ of the trap-door $v^3$. It will now be evident that the trap-door $v^3$ will be normally kept in its upper or closed position by the counterweight $w$ as long as the latter occupies its lowermost position, but that the trap-door $v^3$ will be opened when the counterweight $w$ is raised and the glass cylinder $u$ lowered by the electric motor $s$.

From an inspection of Figs. 2 and 2ª it will be obvious that the motor $m$ serves for swinging all the parts suspended from the lower horizontal rod of the frame $c$.

The electric current to be supplied to the various electric motors and the transformer $l$ is regulated by a controlling apparatus $y$ in a similar manner as in electrically-driven overhead travelers or other cranes. The electric current may be conducted to the several motors and the transformer $l$ by means of movable cables, sliding contacts, and collecting-rings or other known means. (Not shown.) In the drawings only the collecting-rings $z$ are indicated. The controlling apparatus $y$ is assumed to have six hand-cranks, of which, for instance, the crank 1 may control the motor $r$ for revolving the plate $i$ around the axis of its trunnions $h\,h$. The crank 2 may control the transformer $l$ for heating the holding-frame $k$. The crank 3 may control the motor $t$ for blowing the glass. The crank 4 may control the motor $m$ for actuating the crank $n$, and thereby swinging the slotted lever $e$ and the rod $e^2$, with all the parts suspended therefrom, around the axis of the lower horizontal rod of the frame $c$. The crank 5 may control the motor $o$ for revolving the glass cylinder around its axis and that of the rod $e^2$, and the crank 6 may control the motor $s$ for lowering the glass cylinder into the heating-chamber and again raising it.

The apparatus is operated as follows: By energizing the motor $r$ the plate is turned upward to receive the plastic-glass sheet. Thereupon the transformer $l$ is caused to generate the strong current, and thereby to bring the holding-frame $k$ to a red heat, when the glass will adhere to it. The transformer $l$ is then again deënergized and the motor $r$ again energized for turning the plate $i$, with the plastic-glass sheet, downward. Afterward the motor $t$ is actuated for introducing compressed air between the plate $i$ and the glass. The motor $r$ is repeatedly actuated for turning the glass bulb alternately upward and downward, and at last the glass bulb is allowed to hang down, while it is being continuously blown. Now the hollow glass body proper, $u$, is gradually formed by repeatedly and alternately or simultaneously engaging the motors $m$ and $o$, so as to swing or to revolve around their axes the plate $i$, with the holding-frame $k$ and the glass bulb, or to combine these two movements, whereby the glass is gradually and uniformly distributed over the whole body with the aid of centrifugal force. In case the hollow glass body should require reheating the motor $s$ is actuated to lower it into the reheating-chamber $v$. In case the hollow glass body is intended for the manufacture of glass sheets a hole is first made in its bottom by suitable means, as by an electric arc, whereupon the lower part of the glass body is reheated and the motor $o$ is actuated for revolving the body $u$, and thereby widening its lower edge, until a complete cylinder is formed, as indicated by dotted lines. When the cylinder $u$ is completed, the transformer $l$ is again energized to bring the holding-frame $k$ up to a white heat, when the glass adhering to the same will melt and allow of an easy removal of the cylinder, which is then placed on a low carriage C and removed. As is well known, the sheet-glass is made from the cylinder by cutting the latter open and spreading it out.

The apparatus described so far can be modified in various respects without deviating from the spirit of our invention. The reheating-chamber $v$ may be arranged on one side. The electric motors $o$ and $r$ may be arranged for running in both directions, so as to obtain, if need be, a whirling rotating motion of the hollow glass body around its axis and a revolving motion around an axis at right angles thereto. The electric motors may be replaced by other motors or by devices which are controlled from a few or a single motor by means of suitable transmitting means and clutches or other mechanical arrangements. The apparatus can also be employed for the manufacture of a quantity of hollow glass articles at a time, such as is described in the United States Patent No. 651,059, of June 5, 1900. In this case of course the plate $i$ will have to be replaced by a hollow and perforated plate, as is described in this patent. The stage or tower $a$ may be replaced by other structures serving the same purpose.

What we claim as our invention, and desire to secure by Letters Patent, is—

1. The combination with a plate, and means for binding the plastic-glass sheet thereto, of means for turning said plate over so that its glass-holding surface shall face upwardly or downwardly as desired, and means for rotating said plate about a transverse axis and for swinging the plate about a substantially horizontal axis.

2. The combination with a plate for receiving the plastic-glass sheet, of a frame on said plate for holding the edge of the plastic glass, means for blowing the glass, a horizontal shaft, means for raising and lowering said horizontal shaft, means mounted on said horizontal shaft for swinging said plate and said frame with the glass, and means for rotating said plate and said frame with the plastic glass around an axis at right angles to said plate.

3. The combination with a plate for receiving the plastic-glass sheet, of a frame on said plate for holding the edge of the plastic glass, means for blowing the glass, a horizontal shaft, means for raising and lowering said horizontal shaft, means mounted on said horizontal shaft for swinging said plate and said frame with the glass, means for turning said plate and said frame with the plastic glass around an axis parallel to said plate, and means for rotating said plate and said frame with the glass around an axis at right angles to said plate.

4. The combination with a plate for receiving the plastic-glass sheet, of means for holding the edge of the plastic glass to the plate, means for blowing the glass, a horizontal shaft, means for raising and lowering said horizontal shaft, means attached to said horizontal shaft for swinging said plate and said frame with the plastic glass, means for turning said plate and said frame with the glass around an axis parallel to said plate, and means for rotating said plate and said frame with the glass around an axis at right angles to said plate.

5. The combination with a plate for receiving the plastic-glass sheet, of a frame on said plate for holding the edge of the plastic glass, means for blowing the glass, a horizontal shaft, means for raising and lowering said horizontal shaft, a lever fulcrumed on said horizontal shaft, means for swinging said lever, a fork mounted to turn on said lever and adapted for holding said plate and said frame with the plastic glass, means for turning said plate and said frame with the plastic glass in said fork around an axis parallel to said plate, and means for rotating said fork on said lever.

6. The combination with a plate for receiving the plastic-glass sheet, of a frame on said plate for holding the edge of the plastic glass, means for blowing the glass, a horizontal shaft, means for raising and lowering said horizontal shaft, a lever fulcrumed on said horizontal shaft, means for swinging said lever, a motor mounted on said lever, a fork mounted to turn on said lever and adapted for holding said plate and said frame with the plastic glass, a crown-wheel secured on said fork and adapted to be rotated by said motor by means of a pinion, and means for turning said plate and said frame with the plastic glass in said fork around an axis parallel to said plate.

7. The combination with a plate for receiving the plastic-glass sheet, of a frame on said plate for holding the edge of the plastic glass, means for blowing the glass, a horizontal shaft, means for raising and lowering said horizontal shaft, a lever fulcrumed on said horizontal shaft, means for swinging said lever, a motor secured on said lever, a fork mounted to turn on said lever and adapted for holding said plate and said frame with the plastic glass, a crown-wheel secured on said fork and adapted to be rotated by said motor by means of a pinion, a motor on said fork, and means driven from said motor for turning said plate and said frame with the plastic glass in said fork, around an axis parallel to said plate.

8. The combination with a plate for receiving the plastic-glass sheet, of a frame on said plate for holding the edge of the plastic glass, a transformer for heating said frame, means for conducting electric current to said transformer, means for blowing the glass, a horizontal shaft, means for raising and lowering said horizontal shaft, a lever fulcrumed on said horizontal shaft, means for swinging said lever, a motor secured on said lever, a fork mounted to turn on said lever and adapted for holding said plate and said frame with the plastic glass, a crown-wheel secured on said fork and adapted to be rotated by said motor by means of a pinion, and means for turning said plate and said frame with the plastic glass in said fork around an axis parallel to said plate.

9. The combination with a plate for receiving the plastic-glass sheet, of a frame on said plate for holding the edge of the plastic glass, a transformer for heating said frame, means for conducting electric current to said transformer, means for blowing the glass, a horizontal shaft, a rope for raising and lowering said horizontal shaft, a counterweight, means for moving said rope, a lever fulcrumed on said horizontal shaft, means for swinging said lever, a motor secured on said lever, a fork mounted to turn on said lever and adapted for holding said plate and said frame with the plastic glass, a crown-wheel secured on said fork and adapted to be rotated by said motor by means of a pinion, means for turning said plate and said frame with the plastic glass in said fork around an axis at right angles to that of the latter, a reheating-chamber provided with a trap-door, and means controlled by said counterweight for closing and opening said trap-door.

10. The combination with a plate for receiving the plastic-glass sheet, of a frame on said plate for holding the edge of the plastic glass, a transformer mounted on said plate for heating said frame, means for conducting electric current to said transformer, means for blowing the glass, a horizontal shaft, a rope for raising and lowering said horizontal shaft, a counterweight, means for moving said rope in both directions, a lever fulcrumed on said horizontal shaft, means for swinging said lever, a motor secured on said lever, a fork mounted to turn on said lever and adapted for holding said plate and said frame with the plastic glass, a crown-wheel secured on said fork and adapted to be rotated by said motor by means of a pinion, a motor on said fork, means driven from said motor for turning said plate and said frame with the plastic glass in said fork around an axis parallel to said plate, a reheating-chamber provided with a trap-door, and means controlled by said counterweight for closing and opening said trap-door.

11. The combination with a plate for receiving the plastic-glass sheet, of a frame on said plate for holding the edge of the plastic glass, a transformer mounted on said plate for heating said frame, means for conducting electric current to said transformer, means for blowing the glass, a horizontal shaft, a rope for raising and lowering said horizontal shaft, a counterweight, means for moving said rope in both directions, a lever fulcrumed on said horizontal shaft, means for swinging said lever, a motor secured on said lever, a fork mounted to turn on said lever and adapted for holding said plate and said frame with the plastic glass, a crown-wheel secured on said fork and adapted to be rotated by said motor by means of a pinion, means for turning said plate and said frame with the plastic glass in said fork around an axis at right angles to that of the latter, a reheating-chamber provided with a trap-door, means controlled by said counterweight for closing and opening said trap-door, and a carriage for carrying off the finished article.

In testimony whereof we have signed our names to this specification in the presence of two subscribing witnesses.

PAUL THEODOR SIEVERT.
EUGEN KLEIN.

Witnesses:
PAUL E. SCHILLING,
PAUL ARRAS.